United States Patent [19]

Chan

[11] Patent Number: 5,378,582
[45] Date of Patent: Jan. 3, 1995

[54] SYMMETRIC SWEEP SCANNING TECHNIQUE FOR LASER ABLATION

[75] Inventor: Eric Chan, Austin, Tex.

[73] Assignee: Bausch & Lomb Incorporated, Rochester, N.Y.

[21] Appl. No.: 953,408

[22] Filed: Sep. 29, 1992

[51] Int. Cl.$^6$ .............................................. B23K 26/10
[52] U.S. Cl. ................................. 430/321; 430/945; 351/160 H; 351/160 R; 219/121.6; 219/121.76; 219/121.77; 219/121.78
[58] Field of Search ............................. 430/321, 945; 351/160 H, 160 R; 219/121.76, 121.6, 121.77, 121.78, 121.8; 156/643

[56] References Cited

U.S. PATENT DOCUMENTS

| | | | |
|---|---|---|---|
| 4,414,059 | 11/1983 | Blum et al. | 219/121.77 |
| 4,417,948 | 11/1983 | Mayne-Banton | 156/643 |
| 4,563,565 | 1/1986 | Kampfer et al. | 219/121 |
| 4,568,632 | 2/1986 | Blum | 430/322 |
| 4,665,913 | 5/1987 | L'Esperance, Jr. | 219/121.8 |
| 4,887,592 | 12/1989 | Loertscher | 219/121.6 |
| 4,909,818 | 7/1990 | Jones | 351/160 R |
| 5,061,342 | 10/1991 | Jones | 156/643 |
| 5,061,840 | 10/1991 | Portney et al. | 156/643 |
| 5,102,409 | 4/1992 | Balgorod | 219/121.6 |
| 5,170,191 | 12/1992 | Jones | 156/643 |
| 5,256,853 | 10/1993 | McIntyre | 219/121.75 |
| 5,257,706 | 11/1993 | McIntyre | 299/121.69 |

FOREIGN PATENT DOCUMENTS

| | | |
|---|---|---|
| 16145/88 | 11/1988 | Australia . |
| 0189027 | 7/1986 | European Pat. Off. . |
| 0291459 | 11/1988 | European Pat. Off. . |
| 0398082 | 11/1990 | European Pat. Off. . |
| 0525902 | 2/1993 | European Pat. Off. . |
| 59-13589 | 1/1984 | Japan 219/121.77 |
| 63-192582 | 8/1988 | Japan 219/121.77 |
| 2211994 | 8/1990 | Japan 219/121.6 |
| 4182087 | 6/1992 | Japan 219/121.76 |
| 4182088 | 6/1992 | Japan 219/121.76 |
| 2215859 | 9/1989 | United Kingdom . |
| 93/02830 | 2/1993 | WIPO . |

*Primary Examiner*—Charles L. Bowers, Jr.
*Assistant Examiner*—Martin J. Angebranndt
*Attorney, Agent, or Firm*—David M. Krasnow; Craig E. Larson

[57] ABSTRACT

Improved methods for modifying target surfaces through ablation which result in a reduction of ablation debris redeposition on the target surface are disclosed.

10 Claims, 3 Drawing Sheets

SYMMETRIC SWEEP SCANNING TECHNIQUE FOR LASER ABLATION

BACKGROUND OF THE INVENTION

1. Field of the Invention

The present invention relates to the field of laser modification of target surfaces through ablation and methods for smoothing surfaces using lasers as well as targets modified by such ablative techniques.

2. Background of the Invention

The use of laser beams to modify surfaces is known. In the early 1980's, it was discovered that pulsed lasers emitting in the ultraviolet frequency range could affect a target surface through ablative photodecomposition (APD). Later it was found that by using APD, layers of target material could be removed on the order of about one micron of target material per pulse.

It was further noted that APD did not significantly alter the characteristics of the newly exposed material immediately below the ablated material. This phenomenon has been explained as being due to the UV laser providing enough energy in a short enough period of time to actually break the covalent bonds of the polymeric target materials without heating the substrate. (See U.S. Pat. Nos. 4,417,948 and 4,568,632). Further scanning techniques using APD are disclosed in U.S. Pat. No. 5,061,342.

Upon further investigation, it was found that certain materials, when ablated, created varying amounts of debris, some of which was redeposited upon the surface of the target material. It was believed that this redeposited debris somehow frustrated efforts to predictably alter the ablated target surface. Further, it was found that certain materials could not be as cleanly etched as others. A method for ablating a target surface while also removing the deposited and adhered debris from the target surface was not known.

SUMMARY OF THE INVENTION

A novel method to ablate surfaces in a way that simultaneously clears away deposited debris and avoids subsequent debris accumulation has now been determined. To obtain a desired resulting surface on a selected target, the debris formed during the ablation process which becomes redeposited at, and adheres to the target surface must be removed from the target surface before the ablation process continues over the remainder of the target surface.

In accordance with this invention, a method is disclosed for ablating a target surface comprising photoablating a target surface by simultaneously directing a split pulsed beam of UV radiation at said target surface and moving the beams relative to the target surface such that the entire target surface is scanned.

In a further embodiment of the present invention is disclosed a method for photoablating a target surface comprising the steps of a) simultaneously directing a split beam of pulsed UV radiation at a bisecting line on the target surface; and b) scanning the individual beams of the split beam in a direction away from each other and said bisecting line to the opposing edges of the target surface such that the entire target surface is scanned.

In a still further embodiment a method is disclosed for photoablating a target surface comprising the steps of: a) directing a ring-shaped beam of pulsed UV radiation at the centerpoint of the target surface; and b) increasing the radius of said ring-shaped beam such that the beam is scanned simultaneously away from said centerpoint toward the edges of the target surface such that the entire target surface is scanned.

In yet another embodiment is disclosed a method for photoablating a target surface comprising the steps of: a) directing a ring-shaped beam of pulsed UV radiation at the centerpoint of the target surface; and b) progressively increasing the radius of said beam such that the beam is scanned simultaneously in all directions away from said centerpoint to all edges of the target surface such that the entire target surface is scanned.

It is further thought that the invention of the present application is especially useful for profiling, crosslinked, thermoset, thermoplastic or other materials including optically clear materials suitable for use as contact lenses.

DETAILED DESCRIPTION OF THE INVENTION

The present invention relates to a new method of modifying optical surfaces to produce changes in their spherical, cylindrical or other refractive power. This new method is a modification of the procedures taught in U.S. Pat. No. 5,061,342, the entire content of which is incorporated by reference herein.

Figure 1:
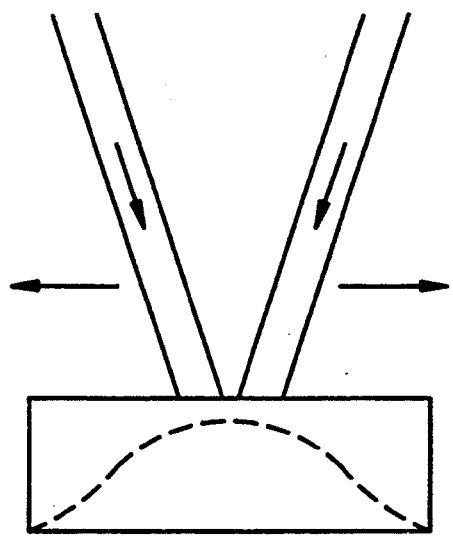
FIG. 1 depicts a cross-sectional view of a contact lens blank. The dotted line is an exaggeration of the desired final toric surface.

As FIG. 1 shows, a toric curve can be placed on the target contact lens blank by removing more material at the periphery of the optical zone. It is understood to the skilled practitioner in the field that surfaces of any configuration can be produced using the present invention and that the figures presented are for illustrative purposes only.

The method of the present invention employs UV radiation to ablate material from a target surface in order to produce a final surface, such as a toric surface. Toric contact lenses are understood to be lenses which correct the insufficient visual acuity caused by astigmatism. Such lenses have a cylindric component of refraction, which refractivity is not constant in all planes passing through the optical axis, but has a maximum refractivity in one plane and a minimum refractivity in another plane perpendicular to the first plane.

Suitable target surfaces to be ablated include contact lenses, contact lens blanks, molds used to make contact lenses, tools used to make such molds, and any object which either directly or indirectly imparts a desired predictable final spherical, cylindrical or other refractive power or geometric shape on an object, such as a contact lens.

Varying amounts of material must often be removed from a target surface to produce a desired end result. For example, to produce toric surfaces on a contact lens, more material must be removed from the edges or periphery of the optical zone than from the central region of the optical zone. (See FIG. 1). Therefore, to produce the toric surface, a significant amount of ablated debris is created at the periphery of the optical zone as compared to the debris created when the central region of the optical zone is scanned and its surface ablated.

It was discovered that when the laser beam begins its scan at the edge of a lens to produce toric surface, significant ablated debris was randomly redeposited on the surface of the lens. Some of the debris was redeposited on the lens target in the path of the laser beam scan. When this occurred, as the laser continued its scan, the first material encountered by the beam was not the original target surface, but was the redeposited and freshly adhered debris from the lens periphery.

While the final surfaces created from the so called edge-to-edge scans described in Pat. No. 5,061,342 were often an improvement over other known surface modification procedures, such as lathing, et al., it was believed that the redeposited debris hindered the best results possible.

Figure 2:
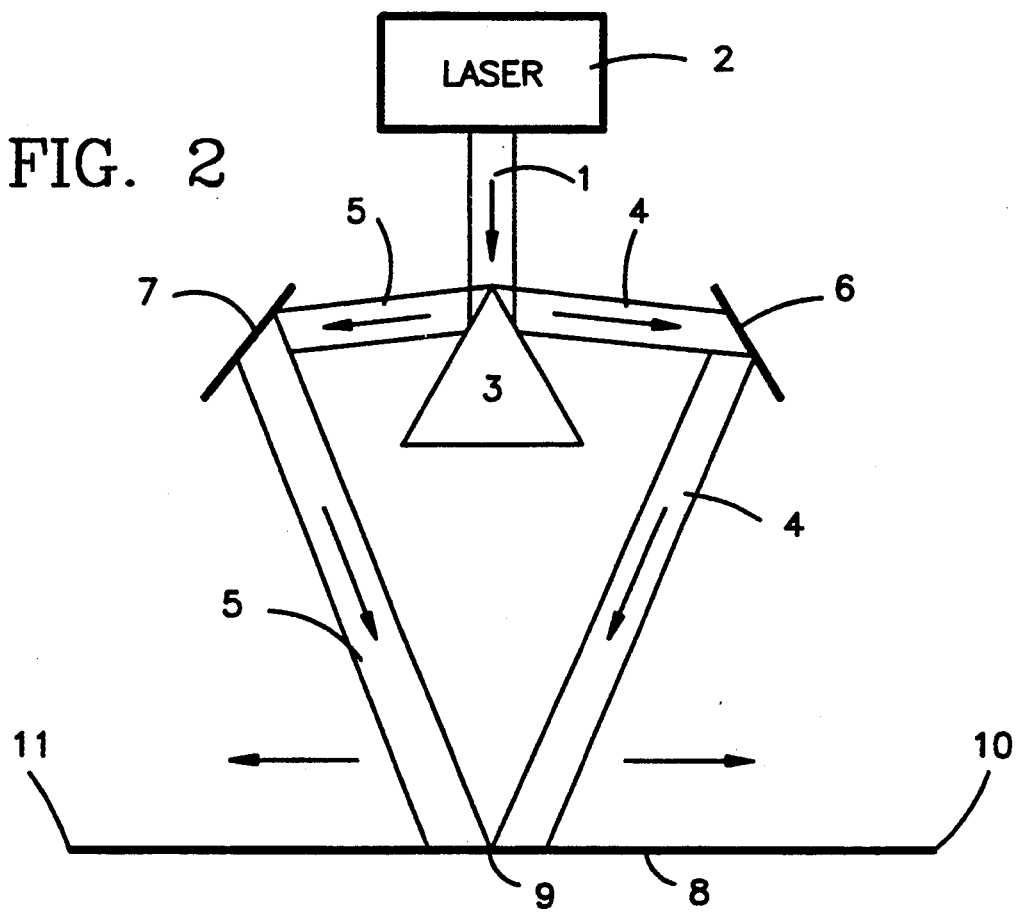
FIG. 2 is a schematic diagram depicting the novel simultaneous split beam scanning technique.
Figure 3:
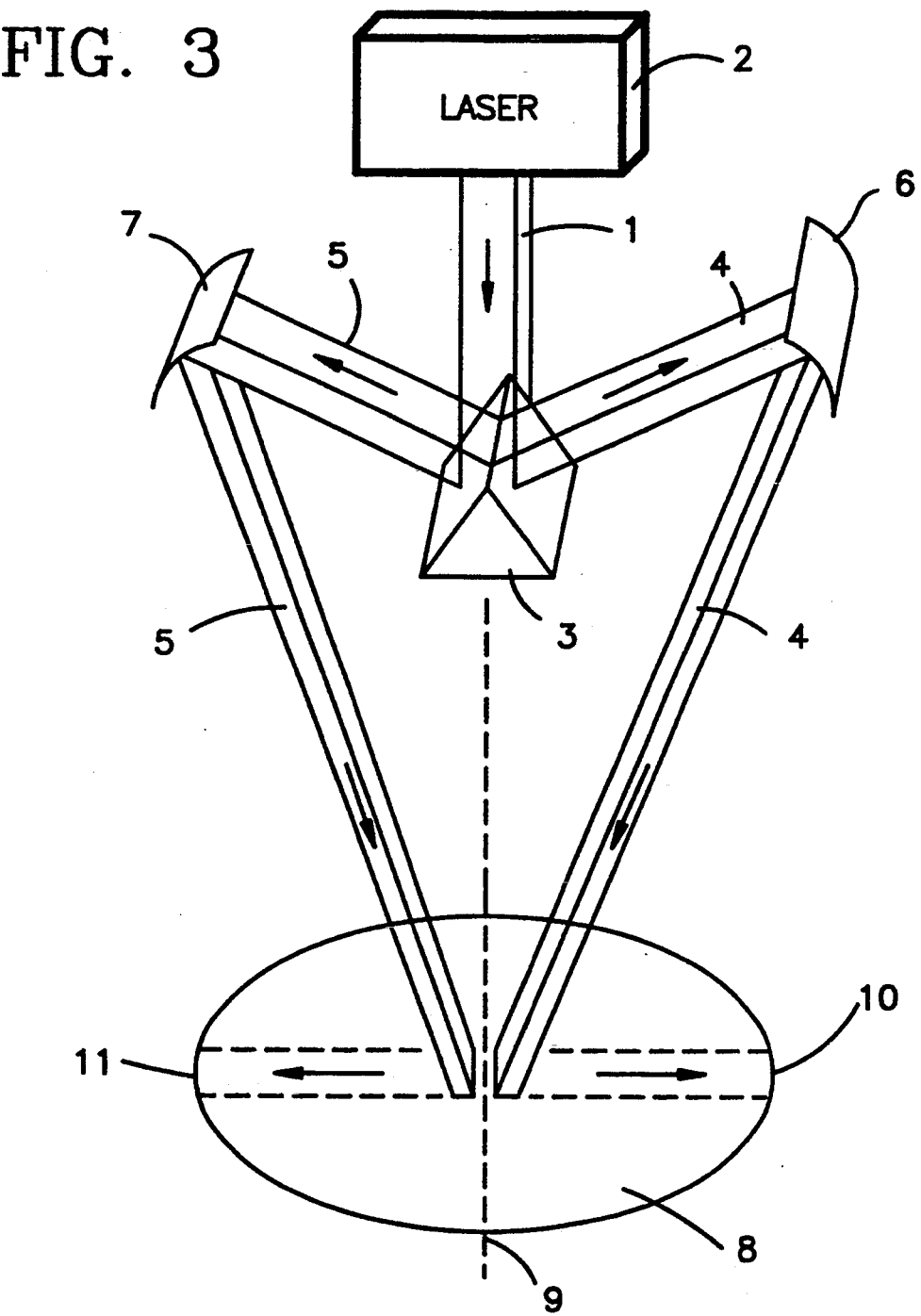
FIG. 3 is a perspective view depicting the simultaneous split beam scanning technique.

Therefore, as contemplated by the present invention, FIGS. 2 and 3 show a raw laser beam (1) emitted from an excimer laser (2). The raw beam is directed to a beam splitting prismatic lens (3) and may have two beams generated (4 and 5). The two beams are then directed to curved secondary mirrors (6 and 7) which in turn direct the beams to the target surface (8). In one embodiment of the present invention the scanning mirrors (6 and 7) are controlled by a computer means (not shown) to simultaneously affect the beams such that the beams simultaneously move across, and scan the surface of the target. In one embodiment suited to the modification or creation of a toric surface, the beams initially converge at a bisecting line (9) of the target surface and are simultaneously scanned in a direction away from each other toward opposing edges (10 and 11) of the target surface effecting a complete scan of the entire target surface. In this way, more of the debris is effectively swept progressively from the optical zone as compared to known edge-to edge scanning techniques.

It is understood that a bisecting line on the target surface is the line extending across the center of the target surface. (The target surface need not be circular or spherical in shape.)

Figure 4:
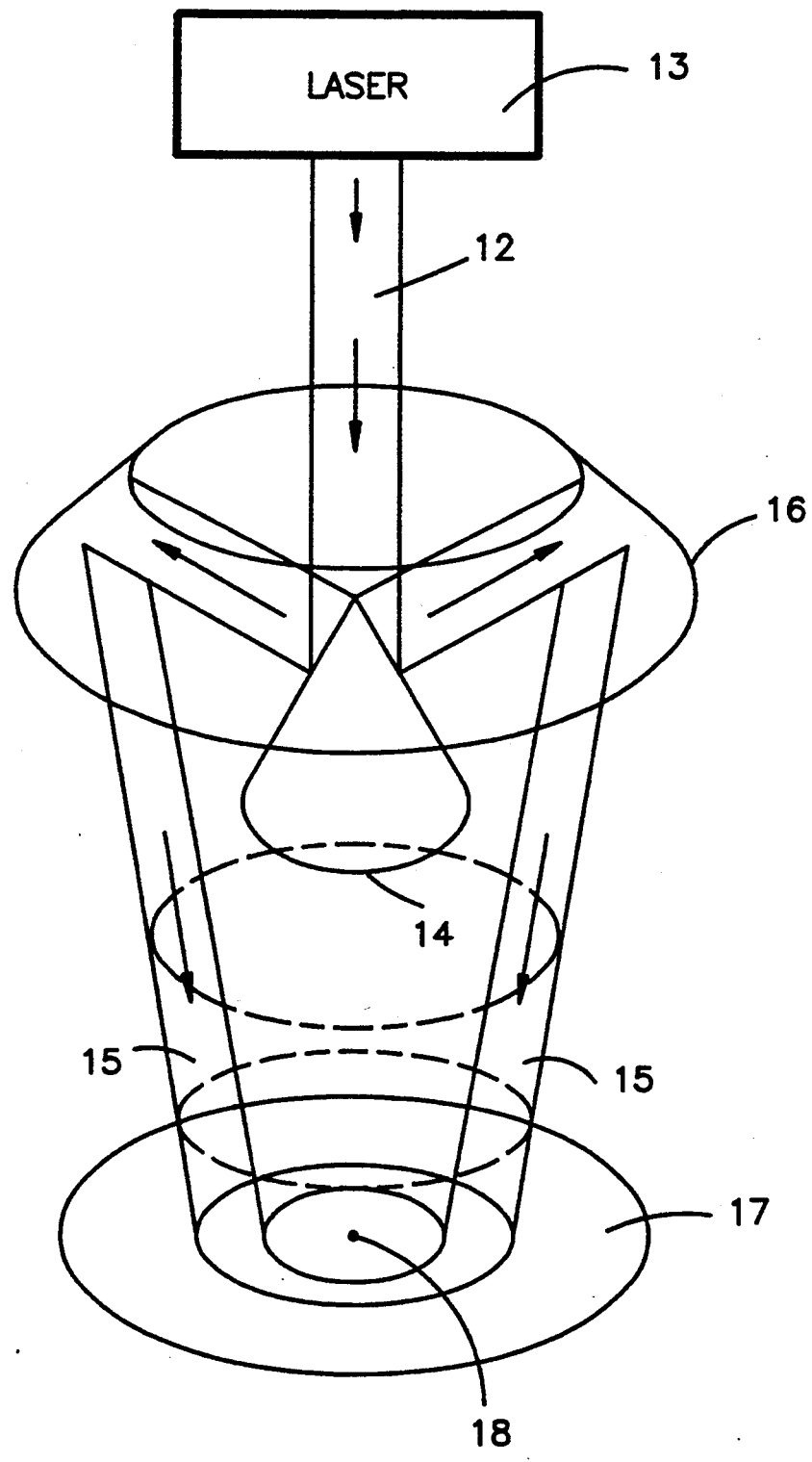
FIG. 4 is diagram showing a representative experimental set up for the ring-shaped beam scanning technique.

In a further embodiment, FIG. 4 shows a ring-shaped beam capable of expanding and contracting which may be used to simultaneously scan multiple regions of the target surface. FIG. 5 depicts such a system where, in one embodiment, the raw beam (12) from an excimer laser (13) may be directed to a conical mirror (14), or other mirror capable of producing a ring-shaped beam (15) which is then directed to an annulus secondary mirror (16). The ring-shaped beam is then directed by the secondary mirror to the target surface. The diameter of the beam may be progressively increased or decreased by moving the conical mirror relative to the secondary annulus mirror. In one embodiment, the ring-shaped beam may then be directed, in its smallest diameter, approaching a point, to the centerpoint (17) of the target surface and expanded outwardly simultaneous extending toward the outermost perimeter of the target surface such that the entire target surface is scanned and the ablated debris is progressively and simultaneously swept outwardly to the periphery of the target surface in all directions. In this way, more of the debris seems to be effectively swept progressively from the optical zone as compared to known edge-to edge scanning techniques.

The laser energy applied to a target per unit area is known as the fluence, which for UV radiation is often expressed in terms of millijoules per square centimeter ($mJ/cm^2$). The fluence range of the laser scanned in accordance with the present invention is preferably from about 20 to about 5000 $mJ/cm^2$, is more preferably from about 500 to about 2000 $mJ/cm^2$, and is most preferably from about 750 to about 1500 $mJ/cm^2$.

It will be readily understood to those skilled in the art that various known reflective and refractive systems may be used to substitute for the reflective (mirror) system which is disclosed above for illustrative purposes only.

A "crosslinked" polymeric material is understood to describe any polymeric material which has any attachment of two chains of its polymer molecules by bridges comprised of either an element, a group, or a compounds known as crosslinking agents.

The term "thermoset" refers to polymeric materials which solidify or "set" irreversibly when heated. By contrast, a "thermoplastic" material is understood to refer to a polymer which softens when exposed to heat and is able to return to its original condition.

While the present invention is well suited for the modification of contact lenses, the modification of contact lens buttons, blanks and molds, as well as the tools used to make the blanks, molds and the contact lenses by the present invention is also contemplated. Indeed any means for imparting optical properties to a target surface may be modified by the present invention. The surface modification through laser scanning of such tools used to make the molds which, in turn, are used to make the contact lens, for example, in a cast molding procedure is disclosed in a concurrently filed and commonly assigned U.S. Pat. application Ser. No. 07/953,425.

The present invention is further thought to be useful for other laser scanning applications such as corneal sculpting and other procedures where ablation debris could conceivably be an obstacle to achieving better target surface quality after scanning.

Many other modifications and variations of the present invention are possible to the skilled practitioner in the field in light of the teachings herein. It is therefore understood that, within the scope of the claims, the present invention can be practiced other than as herein specifically described.

I claim:

1. In a method for photoablating a target surface the improvement of which comprises reducing the amount of ablation debris redeposited on the target surface by directing at least two beams of pulsed UV radiation at the center of the target surface, and scanning the individual beams in a direction away from each other to the opposing edges of the target surface.

2. The method of claim 1 wherein said beams of pulsed UV radiation are emitted from an excimer laser.

3. The method of claim 1 wherein said target surface is comprised of a crosslinked polymeric material.

4. The method of claim 1 wherein said target is a thermoset material.

5. The method of claim 1 wherein said target is a thermoplastic material.

6. The method of claim 1 wherein the fluence of said beams of UV radiation is from about 20 $mJ/cm^2$ to about 5000 $mJ/cm^2$.

7. The method of claim 1 wherein said target is a contact lens.

8. The method of claim 1 wherein said target is a toric contact lens.

9. The method of claim 1 wherein said target is a mold capable of imparting optical properties or surface geometries on a lens.

10. The method of claim 1 wherein the target is a tool used to impart optical properties or surface geometries on molds used to make contact lenses.

* * * * *